US007679226B2

(12) United States Patent
Jajtic et al.

(10) Patent No.: US 7,679,226 B2
(45) Date of Patent: Mar. 16, 2010

(54) SYNCHRONOUS LINEAR MOTOR WITH NON-CONTACTING SCANNING OF THE TOOTHED STRUCTURE OF THE SECONDARY PART

(75) Inventors: Zeljko Jajtic, München (DE); Markus Knorr, Augsburg (DE); Johannes Wollenberg, Gräfelfing (DE)

(73) Assignee: Siemens Aktiengesellschaft, Munich (DE)

( * ) Notice: Subject to any disclaimer, the term of this patent is extended or adjusted under 35 U.S.C. 154(b) by 47 days.

(21) Appl. No.: 11/911,569

(22) PCT Filed: Apr. 12, 2006

(86) PCT No.: PCT/EP2006/061550

§ 371 (c)(1),
(2), (4) Date: Oct. 15, 2007

(87) PCT Pub. No.: WO2006/108855

PCT Pub. Date: Oct. 19, 2006

(65) Prior Publication Data

US 2008/0164830 A1 Jul. 10, 2008

(30) Foreign Application Priority Data

Apr. 15, 2005 (DE) ...................... 10 2005 017 498

(51) Int. Cl.
*H02K 41/00* (2006.01)
*H02K 41/02* (2006.01)
*H02K 41/03* (2006.01)

(52) U.S. Cl. .............. 310/12.19; 310/12.05; 310/12.06; 310/12.15; 310/12.18; 318/38; 318/135; 318/687

(58) Field of Classification Search .................. 310/12, 310/15, 12.05, 12.06, 12.15, 12.18, 12.19, 310/12.01; 104/282, 290; 124/3; 318/38, 318/135, 687; *H02K 41/00, 33/00, 35/00, H02K 41/02, 41/03; H02P 1/00, 3/00, 5/00, H02P 7/00*
See application file for complete search history.

(56) References Cited

U.S. PATENT DOCUMENTS 3,735,231 A * 5/1973 Sawyer ........................ 310/12
3,857,078 A * 12/1974 Sawyer ....................... 318/608
5,091,665 A * 2/1992 Kelly .......................... 310/12
5,434,504 A * 7/1995 Hollis et al. ........... 324/207.17
5,565,752 A * 10/1996 Jansen et al. ................ 310/201

(Continued)

FOREIGN PATENT DOCUMENTS

JP 57 085570 A 5/1982

(Continued)

*Primary Examiner*—Quyen Leung
*Assistant Examiner*—Michael Andrews
(74) *Attorney, Agent, or Firm*—Henry M. Feiereisen; Ursula B. Day

(57) ABSTRACT

The aim of the invention is the equipping of a synchronous linear motor with a non-permanently-magnetic secondary part with a simple positional measuring system. Said aim is achieved, whereby the tooth structure of the toothed rack-shaped non-permanently-magnetic secondary part (S) varies with position in the direction of movement (B). Furthermore, the synchronous linear motor can be provided with absolute and incremental positional measuring systems, such that the coarse resolution of the absolute measuring system can be supplemented by the fine resolution of the incremental system.

5 Claims, 1 Drawing Sheet

U.S. PATENT DOCUMENTS

| | | | | |
|---|---|---|---|---|
| 5,585,709 | A * | 12/1996 | Jansen et al. | 318/807 |
| 5,793,128 | A | 8/1998 | Nanba et al. | |
| 5,828,142 | A | 10/1998 | Simpson | |
| 6,175,169 | B1 * | 1/2001 | Hollis et al. | 310/12 |
| 2002/0117905 | A1 * | 8/2002 | toba | 310/12 |
| 2005/0093377 | A1 * | 5/2005 | Hsiao | 310/12 |

FOREIGN PATENT DOCUMENTS

| | | | |
|---|---|---|---|
| JP | 59 123492 | A | 7/1984 |
| JP | 60 183961 | A | 9/1985 |
| JP | 63 228954 | A | 9/1988 |
| JP | 2001 057713 | A | 2/2001 |

* cited by examiner

SYNCHRONOUS LINEAR MOTOR WITH NON-CONTACTING SCANNING OF THE TOOTHED STRUCTURE OF THE SECONDARY PART

BACKGROUND OF THE INVENTION

The present invention relates to a synchronous linear motor having a secondary part which is in the form of a toothed rod and has no permanent magnets, with the secondary part having a predetermined toothed structure in the movement direction of the synchronous linear motor.

A position signal for determination of the instantaneous commutation angle and/or for position control is required for controlled operation of a synchronous linear motor. This signal is generally obtained from an external position measurement system, which is independent of the active part of the motor. Other known solutions provide for the use of permanent magnets in the secondary part extent, as transmitters for the position signal. Hall sensors are frequently used to obtain signals for this purpose.

However, an external position measurement system is generally complex and is not practicable, or is practicable only with major technical complexity and high costs, in applications with a high degree of dirt or similar disturbances resulting from the working process of the machine. Furthermore, a measurement system with Hall sensors is relatively highly inaccurate for detection of permanent magnets of the secondary part for obtaining position signals, and is therefore only rarely suitable for position control. The reason for this is the mechanical and magnetic tolerances of the secondary part as the transmitter. Specifically, the tolerances in the magnet dimensions and magnetic characteristics of the individual magnets cause sinusoidal or cosinusoidal amplitude errors. Furthermore, position errors of the individual magnets on the secondary part extent cause graduation errors in the measurement system.

For the present document, it should be stressed that the movement of a synchronous linear motor is in principle a relative movement of any type between a primary part and secondary part of the motor even when, for example, all that is described is movement of the primary part over the secondary part. A similar situation applies to the positions of the primary part with respect to the secondary part.

SUMMARY OF THE INVENTION

The object of the present invention is to propose a synchronous linear motor whose position can be determined more easily and better.

According to the invention, this object is achieved by a synchronous linear motor having a primary part and a secondary part which is in the form of a toothed rod and has no permanent magnets, with the secondary part having a predetermined toothed structure in the movement direction of the synchronous linear motor, with a position detection device being arranged directly or indirectly on the primary part in order to scan the toothed structure, without making contact, in order to obtain a position signal, in particular an incremental position signal. In this case, the toothed structure may vary as a function of position, at least in the movement direction. This makes it possible to provide a synchronous linear motor with an integrated position measurement system for position control and/or for determination of the pole position and/or of the commutation angle during converter operation of the synchronous motor. However, this requires the secondary part to be manufactured very exactly, because there is no need from the start, for the primary purpose of the linear motor as a power generator, to produce the secondary part with such fine tolerances that this also results in an accurate dimensional embodiment.

Preferably, the toothed structure is defined by slots between the teeth, and the slots have different depths in the movement direction. The slot depth can then be determined using a magnetic flux sensor. The corresponding position information can be obtained from the slot depth.

Alternatively or additionally, the teeth of the secondary part may have different shape in the movement direction. This can also be detected by means of a flux meter, so that the tooth shape can also provide position information.

In one specific embodiment, the toothed structure is position-dependent transversely with respect to the movement direction of the synchronous linear motor. In this case, a plurality of tracks in the movement direction of the synchronous linear motor each provide position information about its toothed structure (slot depth, tooth shape, etc.), so that the position of the synchronous linear motor can be determined relatively accurately, by combination of these position information items, even over relatively long distances.

The toothed structure advantageously corresponds to a position-dependent coding. In this case, the coding can define an absolute position on the secondary part. The coding may be a binary coding or a coding based on higher values. In particular, the coding may also be multi-digit.

When the linear motor covers relatively long distances, it may be advantageous to subdivide the secondary part into a plurality of sections which are numbered, wherein a sensor for detection of the numbering of the sections is fitted to the primary part of the linear motor or its surrounding structure, such that the position of the primary part of the linear motor can be determined from the numbering and from position information obtained from the toothed structure. This makes it possible to determine absolute position information from coarse absolute information and fine incremental information.

The object mentioned above is also achieved by a synchronous linear motor having a primary part and a secondary part which is in the form of a toothed rod, has no permanent magnets and along which the primary part can move, as well as a position measurement system including a measurement device which is fitted to the secondary part or is integrated in the secondary part, for provision of absolute position information, and a position sensor device for detection of the absolute position information and of incremental information by scanning the teeth of the secondary part and, possibly, of the measurement device, such that the position measurement system can determine an absolute position of the primary part on the basis of the absolute position information and the incremental information.

According to the invention, a coarse-resolution absolute transmitter system can thus be combined with a fine-resolution incremental system. This is advantageous when the absolute position information is contained directly in the toothed structure of the secondary part.

BRIEF DESCRIPTION OF THE DRAWING

The present invention will now be explained in more detail with reference to the attached drawings, in which.

DETAILED DESCRIPTION OF PREFERRED EMBODIMENTS

The exemplary embodiments which are described in more detail in the following text represent preferred embodiments of the present invention.

Figure 1:
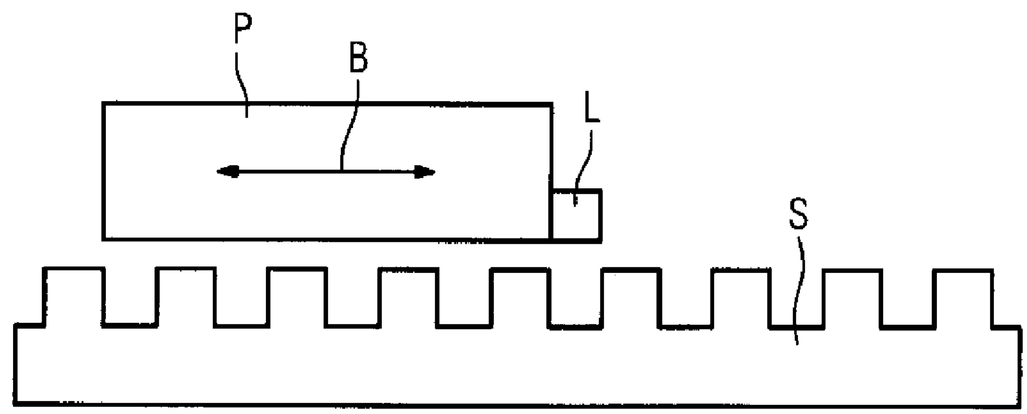
FIG. 1 shows an outline side view of a synchronous linear motor with a position sensor.

In principle, a synchronous linear motor is designed as illustrated in FIG. 1. A primary part P moves linearly relative to a secondary part S which is in the form of a toothed rod. The movement direction B of the linear motor is indicated in FIG. 1 by a double-headed arrow. The permanent magnets are accommodated in the primary part P, so that the secondary part S has no permanent magnets. A position sensor L is attached to the primary part P or to its surrounding structure. This senses the secondary part S mechanically, optically or magnetically. In this case, it has been found to be advantageous to use a toothed-wheel sensor which engages in the teeth of the secondary part S, with the rotation position of the toothed wheel being detected in an appropriate manner. For this purpose, the secondary part can "engage" mechanically or magnetically with the toothed wheel, in the normal manner. In the latter case, magnets are arranged on the toothed wheel, each of which is opposite one tooth of the secondary part, without touching it. This means that the secondary part has two functions. On the one hand, it is used for the primary purpose as a motor part for power generation, and on the other hand it is used as a dimensional embodiment in order to obtain a position signal.

The position measurement system is therefore integrated directly in the synchronous motor, whose field is produced by permanent magnets, but whose secondary part has no permanent magnets, by utilizing the toothed structure of the secondary part as a dimensional embodiment. Various sensors can be used to obtain signals, as has already been indicated above, with known techniques being used to increase the resolution (for example interpolation methods).

Since the secondary part does not use magnets, no fault sources result from mechanical and magnetic tolerances. The accuracy can also be increased by using stamped secondary part laminates. In this case, relatively short secondary part extents are formed from integral, stamped secondary part laminates, so that the length of the laminate strip is equal to the length of the entire secondary part. The length accuracy is then governed solely by the high stamping accuracy.

Relatively long secondary parts are formed in a segmented form, from a plurality of part laminated cores, over their length. A plurality of adjustment variants are possible at the abutment points between part laminated cores, in order to ensure the required graduation accuracy of the dimensional embodiment. By way of example, adjustment can be achieved by appropriate stamped-out areas in the secondary part laminates and/or by adjusting pins.

The tooth system on the secondary part can be used as an incremental transmitter for position determination. However, the invention provides for the secondary part also to be in the form of an absolute position transmitter, by using the toothed structure for shape coding over the secondary part length. In this case, shape coding can be achieved by different slot depths or tooth shapes which can be detected by the sensor.

Figure 2:
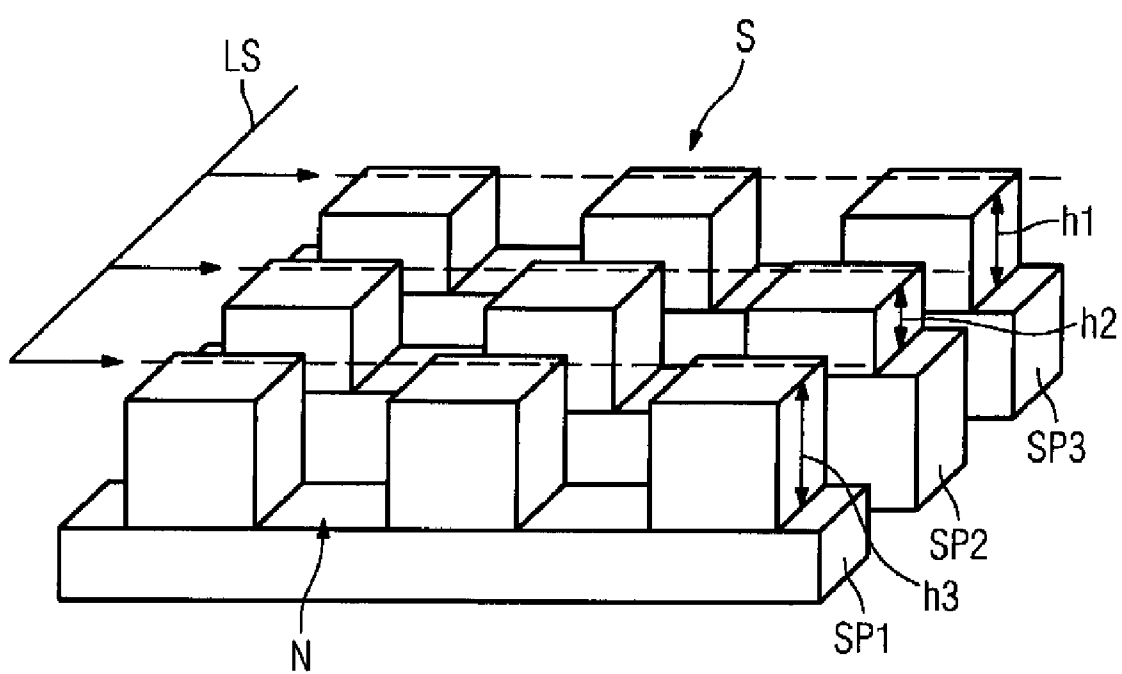
FIG. 2 shows a three-dimensional view of a detail of a secondary part, according to the invention, of a synchronous linear motor.

In contrast, shape coding over relatively long distances is possible, for example, by using the entire width of the extent for coding. For this purpose, the secondary part has a plurality of tracks over its width, thus making it possible to provide multi-digit coding corresponding to the number of tracks, although the tracks need not all be used at the same time for power generation and position measurement. One such exemplary embodiment is illustrated in FIG. 2. In this example, the secondary part S comprises three parallel secondary part tracks SP1, SP2 and SP3.

In this case, the shape coding is provided by the slot depth. The respective slot depth between the teeth corresponds to the code value. In the example selected in FIG. 2, a code word is composed of three code values, corresponding to the depth ranges of a slot N transversely with respect to the movement direction of the synchronous linear motor in all three secondary part tracks SP1, SP2 and SP3. The respective code word defines an unambiguous location on the secondary part S. In the present case, there are three different slot depths h1, h2, h3, which lead to corresponding slot information. This can then be collated to form a three-digit code word.

However, in principle, it is also feasible to use two, four, five or more secondary part tracks, thus resulting in code words with more digits. Instead of a binary code, it is also possible to use a three-value, four-value or greater-value code, with the slot depths being distinguished accordingly. Furthermore, the coding can also be provided by means of different tooth shape sizes, for example using the tooth width.

The secondary part S is scanned by a multi-track position sensor (not shown in FIG. 2). This results in the position sensor tracks LS indicated by arrows. This results in a multi-track position transmitter. If the shape coding is appropriately electromagnetically designed, this has no adverse effect on the power produced by the motor.

The shape coding makes it possible to obtain absolute position information. In contrast, an incremental transmitter simply counts the number of teeth moved over upwards and downwards, so that it can be used only to obtain relative position information. The incremental transmitter is therefore related to the absolute position information. The coarse resolution for obtaining position signals can therefore also be achieved by the shape coding, with the fine resolution being achieved by incremental measurement. This means that the advantages of incremental solution can also be exploited for the application-specific need for absolute position detection.

Alternatively, the secondary part, as the incremental transmitter, can be provided with an absolute transmitter strip, which is attached to the laminated core of the secondary part, in order to unambiguously determine the absolute position of an incremental transmitter period. For example, stamped laminates allow suitable cutouts to be provided for attachment (for example by clipping in) of the so-called endless strips of a coarse absolute measurement system, without major complexity. The absolute code strip can be adjusted relative to the secondary part incremental track by means of adjusting pins, using fitting holes in the stamped laminate, as a result of the high precision of the stamped secondary parts, without major additional complexity.

A system in which the numbering of the secondary part segments is detected by a sensor can also be used as a coarse resolution absolute measurement system. The fine resolution is provided by a tooth sensor including a suitable shape coding within a secondary part segment. In this case, the numbering of the secondary part segment may be in an absolute form (for example a permanently written serial number for the secondary part segment) or a relative form (for example the numbering of the individual secondary part segments being written by a read/write head of the sensor during a reference run in the course of the commissioning process).

One possible way to obtain position signals is, for example, to also use the position dependency of the motor inductances based on the toothed secondary part structure, without a permanent magnet, of the synchronous linear motor. This means that it is not only possible to detect the position of the motor incrementally in order to identify the pole position in which the motor is located.

This means that an absolute transmitter system for coarse resolution can be combined with an incremental system for fine resolution. The shape coding system can be used both as an absolute transmitter system and as an incremental system.

Thus, according to the invention, high-resolution position measurement, which is robust and accurate in comparison to the conventional solutions, can be provided with absolute commutation information within an incremental signal period, by means of a synchronous linear motor with an additional scanning unit, without having to install an additional dimensional component for the scanning unit, in parallel with the motor.

What is claimed is:

1. A synchronous linear motor, comprising:

a primary part;

a secondary part constructed in form of a toothed rod in the absence of permanent magnets, said secondary part having a predetermined multitrack toothed structure in form of a plurality of separate mutually parallel toothed tracks extending in a movement direction of the primary part, wherein teeth in each of the parallel toothed tracks have varying predetermined shapes in the movement direction or are separated by grooves having a redetermined depth that varies in the movement direction, or both; and a multitrack position detection device arranged directly or indirectly on the primary part for scanning the toothed structure, without making contact, to obtain a position signal in form of a code word composed of code values arranged perpendicular to the movement direction, each code value representative of the predetermined tooth shape or groove depth in one of separate toothed tracks, wherein the code word determines a position on the secondary part in the movement direction.

2. The synchronous linear motor of claim 1, wherein the position signal is an incremental position signal.

3. The synchronous linear motor of claim 1, wherein the grooves have different depths in the movement direction.

4. The synchronous linear motor of claim 1, wherein the position-dependent coding defines an absolute position on the secondary part.

5. The synchronous linear motor of claim 1, wherein the secondary part is subdivided into a plurality of sections which are numbered, and further comprising a sensor attached to the primary part for detection of a numbering of the sections so that a position of the primary part is determinable from the numbering and from a position information obtained from the toothed structure.

* * * * *